United States Patent [19]

Yagawa et al.

[11] Patent Number: 5,340,867
[45] Date of Patent: Aug. 23, 1994

[54] FLAME-RETARDANT RUBBER COMPOSITIONS

[75] Inventors: Kazuo Yagawa; Takatsugu Hashimoto; Junichi Yamagishi; Kazuo Hachiya; Satoshi Takezawa, all of Kodaira, Japan

[73] Assignee: Bridgestone Corporation, Tokyo, Japan

[21] Appl. No.: 971,472

[22] Filed: Nov. 4, 1992

[30] Foreign Application Priority Data

Nov. 7, 1991 [JP] Japan .................. 3-318562
Feb. 19, 1992 [JP] Japan .................. 4-069773
Feb. 19, 1992 [JP] Japan .................. 4-069775

[51] Int. Cl.⁵ .............. C08K 3/02; C08K 3/22
[52] U.S. Cl. ..................... 524/80; 524/437; 523/205; 523/206; 523/210
[58] Field of Search ............ 523/205, 206, 210; 524/80, 437

[56] References Cited

U.S. PATENT DOCUMENTS

| | | | |
|---|---|---|---|
| 3,922,442 | 11/1975 | North et al. | 524/437 |
| 3,943,194 | 3/1976 | Dany et al. | 524/80 |
| 4,208,317 | 6/1980 | Cerny et al. | 524/80 |
| 4,325,865 | 4/1982 | Baer | 523/205 |
| 4,785,031 | 11/1988 | Scarso | 524/80 |
| 4,791,160 | 12/1988 | Kato et al. | 524/437 |
| 4,877,823 | 10/1989 | Plachetta et al. | 524/80 |
| 4,948,669 | 8/1990 | Rolland | 524/437 |

FOREIGN PATENT DOCUMENTS

| | | |
|---|---|---|
| 62-059649 | 9/1985 | Japan . |
| 60-206854 | 10/1985 | Japan . |
| 1458194 | 12/1976 | United Kingdom . |

OTHER PUBLICATIONS

Polymeric Binders for Red Phosphorous Pellets and Pro. Symp. Explos. Pyrotech., 13th, III35–III38.
CA 109(14): 112953p (1986).
CA 104(10): 70128n (1985).
CA 107(16): 135672u (1987).

*Primary Examiner*—Veronica P. Hoke
*Attorney, Agent, or Firm*—Sughrue, Mion, Zinn, Macpeak & Seas

[57] ABSTRACT

A flame-retardant rubber composition has an oxygen index of 19.8–27.5 and comprises not more than 24% by weight of red phosphorus as a flame retardant based on the rubber composition and a nitrile group-containing elastomer as a flame-retardant polymer component as a part of rubber ingredients constituting the rubber composition. Such flame-retardant rubber compositions are very useful in applications such as industrial goods, tire and the like strongly requiring the fire preventing function.

11 Claims, 1 Drawing Sheet

FLAME-RETARDANT RUBBER COMPOSITIONS

BACKGROUND OF THE INVENTION

1. Field of the Invention

This invention relates to a flame-retardant rubber composition for use in tires and interior members of railroad and automotive vehicles, building materials, conveyor belts and the like which is capable of preventing fire or fire spreading.

2. Description of the Related Art

Recently, it has been required that conveyor belts, hoses, packing and the like have flame retardance, particularly, when these members are used in a closed space, such as a mine, or in vehicles such as automobiles. Needless to say, durability and strength of these members are required in addition to flame retardance.

Heretofore, many flame-retardant rubber compositions have been prepared by adding various flame retardants such as halogens, metal hydroxides, phosphorus and the like to ordinarily used rubber compositions. In these cases, only the flame retardance or durability was sought to be improved and the achievement of flame retardance and durability or strength was not attempted.

In general, when a flame retardant is added to rubber, a greater amount of the flame retardant is required, so that the properties inherent to a rubber composition are not degraded.

In order to overcome such a problem, it has frequently been attempted to control the degradation of the properties at a minimum and attain a high flame retardance by the synergistic action of a combination of flame retardants or a combination of flame retardant and another substance. For instance, a combination of a halogen flame retardant and antimony oxide, a combination of a halogen flame retardant and metal hydroxide and the like have been used. However, these attempts are not yet sufficient.

SUMMARY OF THE INVENTION

It is, therefore, an object of the invention to provide a flame-retardant rubber composition capable of avoiding degradation of the properties inherent to a rubber composition such as durability, strength and the like with a high flame retardance.

The inventors have aimed at red phosphorus conventionally known as a flame retardant for rubber. When red phosphorus is used alone, sufficient flame retardance is first obtained by adding a great amount of red phosphorus, but the durability, strength and the like are considerably degraded because red phosphorus does not serve as a reinforcement for rubber in contrast to carbon black or the like. In this connection, the inventors have made various studies with respect to the use of red phosphorus for solving the above problems and found that when an elastomer having a nitrile group in its molecule is compounded with red phosphorus, the amount of red phosphorus added to the rubber composition can considerably be reduced without degrading the flame retardance and also the degradation of durability, strength and the like inherent to rubber composition can be avoided, and as a result, the invention has been accomplished.

According to the invention, there is the provision of a flame-retardant rubber composition having an oxygen index of 19.8-27.5 and comprising not more than 24% by weight of red phosphorus as a flame retardant based on the rubber composition and replacing a part of rubber ingredients constituting the rubber composition with a nitrile group-containing elastomer as a flame-retardant polymer component.

BRIEF DESCRIPTION OF THE DRAWING

The invention will be described with reference to the accompanying drawing, wherein.

DESCRIPTION OF THE PREFERRED EMBODIMENTS

Figure 1:
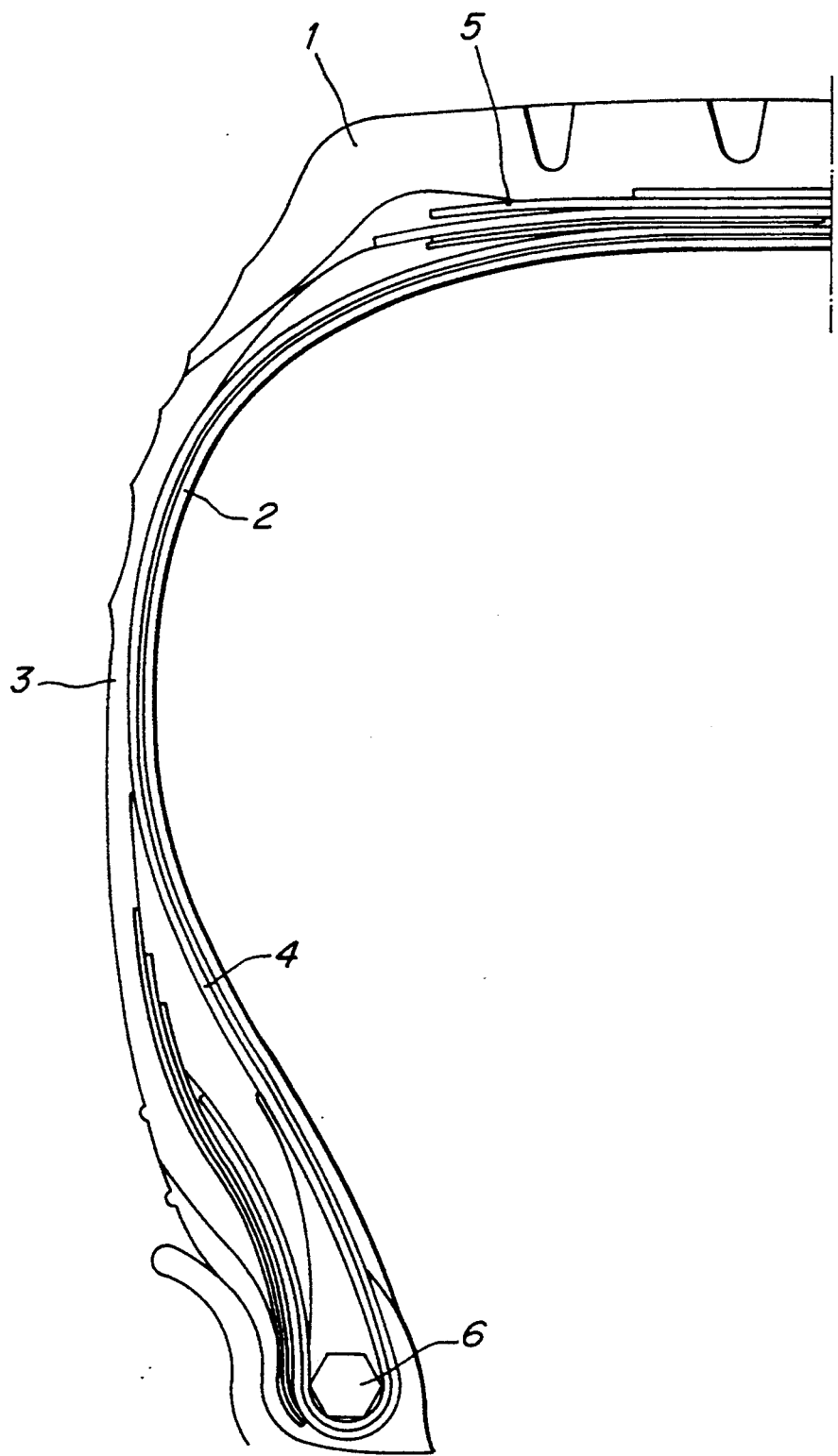
FIG. 1 is a schematically section view of a pneumatic tire using the flame-retardant rubber composition according to the invention as a tread.

The achievement of flame retardance and properties in the flame-retardant rubber composition is not always realized only by determining the weight ratio of the flame retardant, and is first realized by combining the weight ratio of the flame retardant with a value of the oxygen index. In the invention, the value of oxygen index defined in JIS K7201 is used, in which the larger the index value, the more the flame retardance of the rubber composition.

According to the invention, the value of oxygen index is limited to a range of 19.8-27.5. When the oxygen index value is less than 19.8, the properties of the rubber composition can be maintained, but if the rubber is exposed to a fire source having a sufficient heat capacity, it burns and a satisfactory flame retardance can not be obtained. When the value of oxygen index exceeds 27.5, a sufficient flame retardance is obtained, but the abrasion resistance as well as other properties, such as durability, inherent to the rubber composition lower to an impractical extent.

If it is intended to enhance the flame retardance of rubber by the addition of the flame retardant, the compatibility between flame retardant and rubber or the reinforcibility at an interface therebetween largely affects the dynamic properties of the rubber. In this connection, when a small amount of red phosphorus is added alone as a flame retardant to the rubber composition, sufficient flame retardance and reinforcibility to rubber are not obtained. According to the invention, when red phosphorus as a flame retardant is added together with a nitrile group-containing elastomer as a flame-retardant polymer component, the amount of red phosphorus added can be reduced to a minimum extent by the synergistic action of these substances while developing a high flame retardance without degrading the properties of the rubber composition. That is, according to the invention, when red phosphorus is used together with the nitrile group-containing elastomer, if the amount of red phosphorus added to the rubber composition is not more than 24% by weight, satisfactory flame retardance can be developed. Moreover, when the amount of red phosphorus is less than 1% by weight, the effect by the addition of the flame retardant is not obtained. Preferably, the amount of red phosphorus is 5-24% by weight.

The nitrile group-containing elastomer used in the invention can include acrylonitrile-butadiene rubber (NBR) and acrylonitrile-styrene-butadiene terpolymer (ABS). The molecular weight or Mooney viscosity of the elastomer is not particularly restricted as much as it can be kneaded with the rubber ingredient or rubber matrix. Furthermore, the content of nitrile group and the glass transition point Tg are restricted in accordance with the application of the flame-retardant rubber composition. In particular, when the glass transition point of the elastomer is extremely different from that of the rubber matrix, the compatibility between the elastomer and rubber matrix becomes poor. Moreover, the content of nitrile group in the elastomer is 15–45% by weight, preferably 15–30% by weight.

The rubber ingredient used in the rubber composition according to the invention is not particularly restricted, but includes natural rubber (NR), isoprene rubber (IR), styrene-butadiene copolymer rubber (SBR), polybutadiene rubber (BR), ethylene-propylene-conjugated diene terpolymer rubber (EPDM), butyl rubber (IIR), halogenated butyl rubber, fluorine rubber, epichlorohydrin rubber, acrylonitrile-butadiene rubber (NBR) and the like. Since the nitrile group-containing elastomer is added as a flame-retardant polymer component, it is desirable to use a diene-series rubber covulcanizable with such an elastomer from a viewpoint of the reinforcibility.

In a preferred embodiment of the invention, the flame-retardant rubber composition comprises 1–24% by weight of red phosphorus as a flame retardant based on the weight of the rubber composition and not less than 2 parts by weight of an elastomer containing 15–45% by weight of nitrile group as a flame-retardant polymer component based on 100 parts by weight of rubber ingredient constituting the rubber composition.

Among the aforementioned diene series rubbers such as NR, IR, SBR, BR and the like, natural rubber, isoprene rubber and the like develop the tensile strength, while polybutadiene rubber develops the wear resistance. In the flame-retardant rubber composition, when a blend of natural rubber or isoprene rubber and polybutadiene rubber is used as a rubber ingredient, if the amount of natural rubber or isoprene rubber is too high, the tensile strength is improved but the wear resistance is degraded, while if the amount of polybutadiene rubber is too high, the wear resistance is improved but the tensile strength is degraded. In order to establish good tensile strength and wear resistance with a high flame retardance, the natural rubber or isoprene rubber and the polybutadiene rubber are blended at a well-balanced blending ratio as a rubber ingredient in the flame-retardant rubber composition.

In another preferred embodiment of the invention, the flame-retardant rubber composition comprises 50–87 parts by weight of natural rubber and/or polyisoprene rubber, 10–30 parts by weight of polybutadiene rubber and 3–45 parts by weight of a nitrile group-containing elastomer as a flame-retardant polymer component, and 1–24% by weight of red phosphorus as a flame retardant based on the weight of the rubber composition, provided that the total amount of the nitrile group-containing elastomer and red phosphorus is not more than 60% by weight based on the rubber composition.

When the amount of natural rubber and/or polyisoprene rubber is less than 50 parts by weight per 100 parts by weight of total rubber ingredient, the tensile strength is degraded, while when it exceeds 80 parts by weight, the wear resistance is degraded.

When the amount of polybutadiene rubber is less than 10 parts by weight, the wear resistance is degraded, while when it exceeds 30 parts by weight, the tensile strength is degraded.

Moreover, in order to improve the wear resistance by decreasing the amount of polybutadiene rubber added, it is favorable that the polybutadiene rubber is formed by using a cobalt compound as a catalyst and has a weight average molecular weight of 500,000–800,000 and a molecular weight distribution (i.e. weight average molecular weight Mw/number average molecular weight Mn) of 1.8–2.5.

Red phosphorus is a solid solution of black phosphorus and other allotropic forms and is obtained by heating white phosphorus at 250° C. while shutting off air for a long time. Further, red phosphorus does not burn below 240° C. in air. In general, red phosphorus has an extremely low reactivity as compared with that of white phosphorus and is relatively nontoxic.

Since red phosphorus is a non-halogen flame retardant, it has recently been watched in points of flame retardance, low fuming property and nontoxicity. Although the flame-retarding effect of red phosphorus is high, it is lower than the flame-retarding effect of the halogen flame retardant, so that if a higher flame-retarding effect is intended, a greater amount of red phosphorus should be added, which results in the degradation of the dynamic properties of the rubber composition. According to the invention, such a problem is overcome by the synergistic action of red phosphorus and nitrile group-containing elastomer.

Since red phosphorus does not provide the reinforcibility to rubber, it is preferable to finely divide red phosphorus so it avoids being foreign matter, as far as possible. Furthermore, it is favorable to coat red phosphorus with an inorganic substance, a resin or the like from the viewpoint of safety, particularly with respect to operation and storage.

According to the invention, given amounts of red phosphorus and nitrile group-containing elastomer are compounded with rubber ingredient or rubber matrix in the preparation of the flame-retardant rubber composition. In general, red phosphorus promotes the carbonization of the rubber matrix to form a carbide surface layer, whereby oxygen is shut out to provide the flame retardance. Further, phosphorus changes through methaphosphoric acid into polyphosphoric acid to form nonvolatile protection film, which shuts out oxygen. In other words, the flame-retarding effect of red phosphorus is developed by the promotion of carbonization and the formation of protection film. In the invention, the nitrile group-containing elastomer acts to promote the formation of char for the shut of oxygen as a flame-retarding mechanism of red phosphorus, which results in the development of higher flame retardance.

In order to control the degradation of rubber properties due to the addition of red phosphorus to a minimum extent, it is preferable that the average particle size of red phosphorus added is not more than 10 μm, preferably not more than 5 μm. Moreover, when red phosphorus is finely divided to a given particle size, there is a possibility of increasing the risk of ignition or the like in the storage, kneading or working. In the invention, in order to overcome such a risk, a master batch is prepared by dispersing the finely divided red phosphorus into an elastomer composition mainly composed of a diene series rubber. That is, the master batch comprises 50–60% by weight of an elastomer composition and 40–50% by weight of red phosphorus having an average particle size of not more than 10 μm dispersed thereinto.

The elastomer composition used in the preparation of the master batch is a mixture of a diene series rubber, other rubber and a thermoplastic resin. As the diene series rubber, use may be made of the same rubber ingredients as used in the formation of the flame-retardant rubber composition, syndiotactic 1,2-polybutadiene (RB made by Japan Synthetic Rubber Co., Ltd.), transpolyoctenamer (Vestenamer made by Huls AG), low molecular weight isoprene rubber (LIR), low molecular weight NBR (LNBR), 1,2-polybutadiene rubber (1,2-BR), chloroprene rubber (CR) and the like. Among these diene series rubbers, the use of NR, NBR, RB or Vestenamer is preferable from viewpoint of dispersibility of red phosphorus and rubber properties.

According to the invention, the production of the flame-retardant rubber composition can safely be conducted by the use of the master batch containing finely divided red phosphorus as a flame retardant.

The flame-retardant rubber composition according to the invention further contains 6–30 parts by weight of aluminum hydroxide per 100 parts by weight of the rubber ingredient and an inorganic reinforcement provided that the weight ratio of aluminum hydroxide to sum of aluminum hydroxide and inorganic reinforcement is not more than 0.65.

The inorganic reinforcement can include carbon black, silica and the like. Examples of carbon black, can include FEF, HAF, IISAF, N339, ISAF, SAF and the like.

Aluminum hydroxide [Al(OH)$_3$] preferably has an average particle size of not more than 1.0 μm. Since aluminum hydroxide releases 80% by weight of crystallization water at a temperature between 200° C. and 300° C., when it is contained in the flame-retardant rubber composition, the burning temperature is lowered by the endothermic reaction of aluminum hydroxide, whereby the flame-retarding effect is more developed, together with the synergistic action of red phosphorus and nitrile group-containing elastomer.

When the amount of aluminum hydroxide added is not less than 6 parts by weight but not more than 30 parts by weight, a more preferable synergistic action with the red phosphorus and elastomer is obtained to develop a more improved flame-retarding effect. On the other hand, when the weight ratio of aluminum hydroxide to sum of aluminum hydroxide and inorganic reinforcement is not more than 0.65, the tensile strength, particularly high-temperature tensile strength of the rubber composition is further improved.

Moreover, when aluminum hydroxide is subjected to a surface treatment with a silane coupling agent or aluminum hydroxide is added together with a silane coupling agent, the reinforcing effect is more enhanced without the degradation of tensile strength, particularly high-temperature tensile strength. As a result, the amount of carbon black added can be decreased and also the heat generation of the resulting rubber composition can advantageously be reduced. Particularly, when the silane coupling agent is added together with aluminum hydroxide, the amount of the silane coupling agent added is 2–40% by weight to the weight of aluminum hydroxide used.

Examples of the silane coupling agent include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-mercaptopropyl trimethoxysilane, 3-mercaptopropyl triethoxysilane, 2-mercaptoethyl trimethoxysilane, 2-mercaptoethyl triethoxysilane, 3-nitropropyl trimethoxysilane, 3-nitropropyl triethoxysilane, 3-chloropropyl trimethoxysilane, 3-chloropropyl triethoxysilane, 2-chloroethyl trimethoxysilane, 2-chloroethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyl dimethoxymethylsilane, 3-nitropropyl dimethoxymethylsilane, 3-chloropropyl dimethyoxymethylsilane, dimethoxymethylsilylpropyl-N,N-didmethylthiocarbamoyl tetrasulfide, dimethoxymethylsilylpropyl benzothiazole tetrasulfide and the like. Among them, bis(3-triethoxysilylpropyl) tetrasulfide, 3-trimethoxysilylpropyl benzothiazole tetrasulfide and the like are preferable.

Furthermore, various additives used in the usual rubber composition such as reinforcing agent, filler, softening agent, vulcanizing agent, vulcanization accelerator, antioxidant and the like may be compounded with the flame-retardant rubber composition according to the invention.

The following examples are given in illustration of the invention and are not intended as limitations thereof.

EXAMPLES 1–4, COMPARATIVE EXAMPLES 1–5

Various flame-retardant rubber compositions were prepared according to a compounding recipe shown in Table 1 and applied to a tread of a pneumatic radial tire having a tire size of 13/80R20 as shown in FIG. 1, in which numeral 1 is a tread, numeral 2 an inner liner, numeral 3 a sidewall portion, numeral 4 a radial carcass, numeral 5 a belt and numeral 6 a bead core.

After the vulcanization, the tensile strength was measured according to a method of JIS K6301, and the oxygen index was measured according to a method of JIS K7201, and the fuming property (the index value was based on Comparative Example 2 and was set at 100, and smaller the index value, the better the property) was measured according to a method of JIS D1321. The measured results are shown in Table 1.

Then, the tire was mounted onto a vehicle and actually run, during which the wear resistance and durability (resistance to heat separation) were evaluated to obtain results as shown in Table 1.

The flame retardance of the tire was evaluated by a test in which the tire was mounted onto a normal rim, inflated under a normal internal pressure, heated by means of a butane gas burner, a nozzle of which is positioned at a distance of 5 cm apart from a lower face of the tread in the horizontally held tire, at a flame temperature of about 1000° C. under conditions that height, width and thickness of flame are about 10 cm×10 cm×about 1 cm for 15 minutes.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| natural rubber | 90.0 | 75.0 | 65.0 | 70.0 | 100 | 100 | 100 | 100 | 50.0 |

TABLE 1-continued

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| NBR (nitrile group: 20%) | 10.0 | 25.0 | 35.0 | ABS 30.0 | 0.00 | 0.00 | 0.00 | 0.00 | 50.0 |
| carbon black | 45.0 | 45.0 | 45.0 | 45.0 | 45.0 | 45.0 | 45.0 | 45.0 | 45.0 |
| stearic acid | 2.00 | 2.00 | 2.00 | 2.00 | 2.00 | 2.00 | 2.00 | 2.00 | 2.00 |
| zinc white | 4.00 | 4.00 | 4.00 | 4.00 | 4.00 | 4.00 | 4.00 | 4.00 | 4.00 |
| sulfur | 1.50 | 1.50 | 1.50 | 1.50 | 1.50 | 1.50 | 1.50 | 1.50 | 1.50 |
| vulcanization accelerator CZ[*1] | 0.85 | 0.85 | 0.85 | 0.85 | 0.85 | 0.85 | 0.85 | 0.85 | 0.85 |
| anitoxidant Santoflex 13[*2] | 1.40 | 1.40 | 1.40 | 1.40 | 1.40 | 1.40 | 1.40 | 1.40 | 1.40 |
| chlorinated paraffin[*3] | 0.00 | 0.00 | 0.00 | 0.00 | 10.0 | 0.00 | 20.0 | 28.0 | 0.00 |
| antimony trioxide[*4] | 0.00 | 0.00 | 0.00 | 0.00 | 2.00 | 0.00 | 3.00 | 4.80 | 0.00 |
| aluminum hydroxide[*5] | 0.00 | 0.00 | 0.00 | 0.00 | 7.00 | 0.00 | 15.0 | 22.0 | 0.00 |
| red phosphorus[*6] | 3.00 | 10.0 | 10.0 | 10.0 | 0.00 | 0.00 | 0.00 | 0.00 | 60.0 |
| oxygen index | 21.3 | 24.8 | 23.8 | 25.0 | 21.0 | 19.2 | 23.5 | 26.1 | 40.5 |
| tensile strength[*7] (index) | about 100 | 98 | 98 | 98 | about 100 | 100 | 98 | 95 | 67 |
| wear resistance[*8] (index) | about 100 | 97 | 96 | 97 | about 100 | 100 | 97 | 94 | 50 |
| resistance to heat separation | ○ | ○ | ○ | ○ | △ | ○ | X | X | X |
| flame retardance of tire | flame disappears in 2 minutes | flame disappears immediately | flame disappears immediately | flame disappears immediately | flame disappears in 5 minutes | burnt out | flame disappears immediately | flame disappears immediately | flame disappears immediately |
| fuming property (index) | 70 | 29 | 31 | 33 | 114 | 100 | 123 | 140 | 18 |

[*1] N-cyclohexyl-2-benzothiazyl-sulfenamide
[*2] N-(1,3-dimethylbutyl)-N'-phenyl-p-phenylenediamine
[*3] Enparachlo, trade name, made by Ajinomoto Co., Inc.
[*4] ATOX, trade name, made by the Nihon Mining & Concentrating Co., Ltd.
[*5] Higilite H42S, trade name, made by Showa Denko K.K.
[*6] Hishigard AP, trade name, made by Nippon Kagaku Kogyo K.K.
[*7] measured by tensioning a specimen of ASTM-JIS No. 3 at 25° C. and a tensile speed of 500 mm/min.
[*8] average index value measured at slipping ratios of 60% and 25% by means of a BS-type Lambourn abrasion machine As seen from Table 1, all of the flame-retardant rubber compositions according to the invention (Examples 1–4) are excellent in the flame retardance, low fuming property and other properties as compared with the comparative examples.

In the above examples, the flame-retardant rubber composition was applied to the tread in view of the test obtain results as shown in Table 2. In the control, the rubber composition did not contain the nitrile group-containing elastomer as a flame-retardant polymer component, so that the flame retardance was considerably poor and unacceptable. In all examples, the flame disappeared immediately after the flame-retarding test on the tires.

TABLE 2

|  | Example | | | | | | | | | | | Control |
| --- | --- | --- | --- | --- | --- | --- | --- | --- | --- | --- | --- | --- |
|  | 5 | 6 | 7 | 8 | 9 | 10 | 11 | 12 | 13 | 14 | 15 |  |
| Natural rubber | 63 | 53 | 50 | 30 | 53 | 63 | 33 | 83 | — | 61 | 70 | 100 |
| Polybutadiene rubber[*1] | 20(a) | 30(a) | 20(a) | 53(b) | 30(b) | 20(b) | 50(a) | — | 83(a) | 9(a) | — | — |
| NBR (nitrile group: 20%) | 17 | 17 | 30 | 17 | 17 | 17 | 17 | 17 | 17 | 30 | 30 | — |
| Red phosphorus (wt % based on rubber composition) | 8.1 (5) | 8.1 (5) | 15.2 (9) | 8.1 (5) | 8.1 (5) | 8.1 (5) | 8.1 (5) | 8.1 (5) | 8.1 (5) | 15.2 (9) | 15.2 (9) | 8.1 (5) |
| Carbon black ISAF | 46 | 46 | 46 | 46 | 46 | 46 | 46 | 46 | 46 | 46 | 46 | 46 |
| Stearic acid | 2 | 2 | 2 | 2 | 2 | 2 | 2 | 2 | 2 | 2 | 2 | 2 |
| Zinc white | 3.5 | 3.5 | 3.5 | 3.5 | 3.5 | 3.5 | 3.5 | 3.5 | 3.5 | 3.5 | 3.5 | 3.5 |
| Sulfur | 1.5 | 1.5 | 1.5 | 1.5 | 1.5 | 1.5 | 1.5 | 1.5 | 1.5 | 1.5 | 1.5 | 1.5 |
| Vulcanization accelerator CZ | 1.0 | 1.0 | 1.0 | 1.0 | 1.0 | 1.0 | 1.0 | 1.0 | 1.0 | 1.0 | 1.0 | 1.0 |
| Tensile strength[*2] | 105 | 100 | 100 | 75 | 90 | 100 | 90 | 115 | 50 | 105 | 110 | 130 |
| Wear resistance[*3] | 100 | 110 | 108 | 115 | 100 | 90 | 125 | 85 | 150 | 98 | 80 | 100 |
| Oxygen index[*4] | 21.0 | 21.0 | 23.5 | 21.0 | 21.0 | 21.0 | 21.0 | 21.0 | 21.0 | 23.5 | 23.5 | 19.0 |

[*1] (a) use Co catalyst
(b) use Ni catalyst
[*2] measured by tensioning a specimen of ASTM-JIS No. 3 at 25° C. and a tensile speed of 500 mm/min.
[*3] average index value measured at slipping ratios of 60% and 25% by means of a BS-type Lambourn abrasion machine
[*4] measured according to a method of JIS K7201 for the flame retardance of the tire, but it may be applied to the sidewall portion in addition to the tread.

EXAMPLES 5-15

Various flame-retardant rubber compositions were prepared according to a compounding recipe shown in Table 2 and applied to a tread of a pneumatic radial tire as shown in FIG. 1. Thereafter, the tensile strength, wear resistance and oxygen index were measured to In Table 2, the polybutadiene rubber obtained by using a Co catalyst had a weight average molecular weight of 600,000 and Mw/Mn of 2.2, while the polybutadiene rubber obtained by using a Ni catalyst had a weight average molecular weight of 480,000 and Mw.Mn of 3.8.

EXAMPLES 16-21

Various flame-retardant rubber compositions were prepared according to a compounding recipe as shown in Table 3. Then, the tensile strength and oxygen index were measured with respect to these rubber compositions to obtain results as shown in Table 3.

TABLE 3

| | Example | | | | | | Con- |
|---|---|---|---|---|---|---|---|
| | 16 | 17 | 18 | 19 | 20 | 21 | trol |
| Natural rubber | 53 | 53 | 38 | 38 | 53 | 38 | 53 |
| BR$^{(a)}$ | 20 | 20 | 20 | 20 | 20 | 20 | 20 |
| NBR (nitrile group: 20%) | 27 | 27 | 27 | 27 | 27 | 27 | 27 |
| Red phosphorus (15 μm) | — | — | — | — | 15 | — | 13 |
| Red phosphorus (8 μm) | 15 | — | — | — | — | — | — |
| Red phosphorus (4 μm) | — | 15 | — | — | — | — | — |
| LIR + red phosphorus (4 μm) | — | — | 30 | — | — | 30*¹ | — |
| NR + red phosphorus (4 μm) | — | — | — | 30 | — | — | — |
| Pure red phosphorus *² | 8.8 | 8.8 | 8.8 | 8.8 | 8.8 | 8.8 | — |
| Carbon black | 45 | 45 | 45 | 45 | 45 | 45 | 45 |

| ISAF | | | | | | | |
|---|---|---|---|---|---|---|---|
| Stearic acid | 2.0 | 2.0 | 2.0 | 2.0 | 2.0 | 2.0 | 2.0 |
| Zinc white | 4.0 | 4.0 | 4.0 | 4.0 | 4.0 | 4.0 | 4.0 |
| Sulfur | 1.5 | 1.5 | 1.5 | 1.5 | 1.5 | 1.5 | 1.5 |
| Vulcanization accelerator CZ | 0.85 | 0.85 | 0.85 | 0.85 | 0.85 | 0.85 | 0.85 |
| Antioxidant Santoflex 13 | 1.40 | 1.40 | 1.40 | 1.40 | 1.40 | 1.40 | 1.40 |
| Tensile strength*³ | 92 | 93 | 92 | 96 | 90 | 96 | 100 |
| Oxygen index (O.I.) | 24 | 24 | 24 | 14 | 24 | 24 | 20.2 |

*¹RB + red phosphorus (4 μm)
RB is syndiotactic 1,2-polybutadiene made by Japan Synthetic Rubber co., Ltd. (RB 805).
*²weight percent based on the total rubber composition
*³Index value based on control The flame retardant used in Table 3, red phosphorus, was Hishigard CP (trade name, made by Nippon Kagaku Kogyo K.K.), in which the numerical value in parenthesis means an average particle size, and LIR+red phosphorus (4 μm) was a master batch obtained by dispersing red phosphorus into low molecular weight liquid polyisoprene rubber (Kuraprene LIR50, trade name, made by Kuraray Co., Ltd.) (red phosphorus:LIR=50:50), and RB+red phosphorus (4 μm) was a master batch obtained by dispersing red phosphorus into syndiotactic 1,2-polybutadiene (RB805, trade name, made by Japan Synthetic Rubber Co., Ltd.) (red phosphorus:RB=15:15), and NR+red phosphorus (4 μm) was a master batch obtained by dispersing red phosphorus into natural rubber (red phosphorus:NR=50:50), and pure red phosphorus was a coating of Hishigard CP (trade name, made by Nippon Kagaku Kogyo K.K.) with Al(OH)$_3$ having a pure red phosphorus content of 85% by weight and represented by weight percentage based on the rubber composition.

EXAMPLES 22-28, COMPARATIVE EXAMPLES 6-9

Various flame-retardant rubber compositions were prepared according to a compounding recipe as shown in Table 4. Then, the tensile strength and oxygen index were measured with respect to these rubber compositions to obtain results as shown in Table 4.

TABLE 4

| | Comparative Example | | Example | | | | | | | Comparative Example | |
|---|---|---|---|---|---|---|---|---|---|---|---|
| | 6 | 7 | 22 | 23 | 24 | 25 | 26 | 27 | 28 | 8 | 9 |
| Natural rubber | 53 | 53 | 53 | 53 | 53 | 53 | 53 | 53 | 53 | 53 | 53 |
| BR$^{(a)}$ | 20 | 20 | 20 | 20 | 20 | 20 | 20 | 20 | 20 | 20 | 20 |
| NBR (nitrile group: 20%) | 27 | 27 | 27 | 27 | 27 | 27 | 27 | 27 | 27 | 27 | 27 |
| Red phosphorus (8 μm) (wt % based on rubber composition) | — | — | 8 | 8 | 8 | 8 | 8 | 8 | 8 | 8 | 8 |
| Carbon black ISAF | 45 | 45 | 45 | 45 | 45 | 25 | 25 | 45 | 45 | 20 | 15 |
| Aluminum hydroxide (average particle size: 3.5 μm) | — | — | — | 10 | — | — | — | — | — | — | — |
| Aluminum hydroxide (average particle size: 1.0 μm) | — | — | — | — | 10 | — | — | — | — | — | — |
| Aluminum hydroxide (average particle size: 0.5 μm) | 6 | 10 | — | — | — | 10 | 30 | — | 10 | 35 | 30 |
| Silane coupling agent*¹ | — | 0.6 | 1.0 | 1.0 | 1.0 | 1.0 | 3.0 | — | — | 3.5 | 3.0 |
| Al(OH)$_3$ treated with silane coupling agent*² | — | — | — | — | — | — | — | 11 | — | — | 11 |
| Stearic acid | 2 | 2 | 2 | 2 | 2 | 2 | 2 | 2 | 2 | 2 | 2 |
| Zinc white | 3.5 | 3.5 | 3.5 | 3.5 | 3.5 | 3.5 | 3.5 | 3.5 | 3.5 | 3.5 | 3.5 |
| Sulfur | 1.5 | 1.5 | 1.5 | 1.5 | 1.5 | 1.5 | 1.5 | 1.5 | 1.5 | 1.5 | 1.5 |
| Vulcanization accelerator CZ | 1.0 | 1.0 | 1.0 | 1.0 | 1.0 | 1.0 | 1.0 | 1.0 | 1.0 | 1.0 | 1.0 |
| Antioxidant Santoflex 13 | 1.0 | 1.0 | 1.0 | 1.0 | 1.0 | 1.0 | 1.0 | 1.0 | 1.0 | 1.0 | 1.0 |
| Ratio of Al(OH)$_3$/inorganic reinforcement + Al(OH)$_3$ | 0.12 | 0.18 | — | 0.18 | 0.18 | 0.18 | 0.55 | 0.18 | 0.18 | 0.64 | 0.67 |
| Tensile strength*³ | 105 | 105 | 100 | 90 | 105 | 105 | 105 | 105 | 98 | 90 | 90 |
| Oxygen index*⁴ | 19.3 | 19.7 | 22.0 | 23.5 | 23.5 | 23.5 | 26.0 | 23.5 | 21.0 | 26.5 | 26.0 |

*¹bis(3-triethoxysilylpropyl)tetrasulfide
*²Al(OH)$_3$ having an average particle size of 0.5 μm is subjected to a surface treatment by increasing in the silane coupling agent of the item *¹ (amount of silane coupling agent: 10 wt %)
*³measured by tensioning a specimen of ASTM-JIS No. 3 at 25° C. and a tensile speed of 500 mm/min.
*⁴measured according to a method of JIS K7201.

As mentioned above, according to the flame-retardant rubber composition of the invention, the flame retardance can effectively be provided without the degradation of the properties inherent to the rubber composition and also the low fuming property can be obtained as compared with the conventional halogen flame retardant. Furthermore, the products obtained by using the flame-retardant rubber composition according to the invention can develop a fire preventing function, so that they are very useful in applications such as industrial goods, tire and the like strongly requiring the fire preventing function.

What is claimed is:

1. A flame-retardant rubber composition having an oxygen index of 19.8-27.5 and comprising not more than 24% by weight of red phosphorus as a flame retardant based on the rubber composition and replacing a part of rubber ingredients constituting the rubber composition with at least one nitrile group-containing elastomer selected from the group consisting of an acrylonitrile-butadiene rubber and an acrylonitrile-styrene-butadiene terpolymer as a flame-retardant polymer component.

2. The flame-retardant rubber composition according to claim 1, wherein said rubber composition comprises 1–24% by weight of red phosphorus as a flame retardant based on the weight of the rubber composition and not less than 2 parts by weight of an elastomer containing 15–45% by weight of nitrile group as a flame-retardant polymer component based on 100 parts by weight of rubber ingredient constituting the rubber composition.

3. The flame-retardant rubber composition according to claim 2, wherein said elastomer contains 15–30% by weight of nitrile group.

4. The flame-retardant rubber composition according to claim 1, wherein said rubber composition comprises 50–87 parts by weight of natural rubber and/or polyisoprene rubber, 10–30 parts by weight of polybutadiene rubber and 3–45 parts by weight of a nitrile group-containing elastomer as a flame-retardant polymer component, and 1–24% by weight of red phosphorus as a flame retardant based on the weight of the rubber composition, provided that the total amount of the nitrile group-containing elastomer and red phosphorus is not more than 60% by weight based on the rubber composition.

5. The flame-retardant rubber composition according to claim 4, wherein said polybutadiene rubber is obtained by polymerization using a cobalt compound as a catalyst.

6. The flame-retardant rubber composition according to claim 4, wherein said polybutadiene rubber has a weight average molecular weight of 500,000–800,000 and a ratio of weight average molecular weight to number average molecular weight of 1.8–2.5.

7. The flame-retardant rubber composition according to claim 1, wherein said red phosphorus has an average particle size of not more than 10 $\mu$m.

8. The flame-retardant rubber composition according to claim 1, wherein said rubber composition further contains 6–30 parts by weight of aluminum hydroxide per 100 parts by weight of the rubber ingredient and an inorganic reinforcement provided that a weight ratio of aluminum hydroxide to sum of aluminum hydroxide and inorganic reinforcement is not more than 0.65.

9. The flame-retardant rubber composition according to claim 8, wherein said aluminum hydroxide has an average particle size of not more than 1.0 $\mu$m.

10. The flame-retardant rubber composition according to claim 8, wherein said aluminum hydroxide is subjected to a surface treatment with a silane coupling agent.

11. The flame-retardant rubber composition according to claim 8, wherein a silane coupling agent is further added in an amount of 2–40% by weight per the weight of said aluminum hydroxide.

* * * * *